(12) United States Patent
Knapp

(10) Patent No.: US 7,517,378 B2
(45) Date of Patent: Apr. 14, 2009

(54) INTEGRAL RIGID EDGING FOR SYNTHETIC AIR FILTERS

(76) Inventor: Steven E. Knapp, 7 White Pine Trail, Loretto, Ontario (CA) L0G 1L0

( * ) Notice: Subject to any disclaimer, the term of this patent is extended or adjusted under 35 U.S.C. 154(b) by 331 days.

(21) Appl. No.: 11/621,405

(22) Filed: Jan. 9, 2007

(65) Prior Publication Data

US 2008/0163595 A1 Jul. 10, 2008

(51) Int. Cl.
  *B01D 46/10* (2006.01)
  *B01D 39/14* (2006.01)
  *B01D 39/16* (2006.01)

(52) U.S. Cl. .............. 55/511; 55/495; 55/502; 55/528; 55/DIG. 5; 55/DIG. 31

(58) Field of Classification Search ............ 55/490, 55/495, 497, 502, 511, 527, 528, 529, DIG. 5, 55/DIG. 31
See application file for complete search history.

(56) References Cited

U.S. PATENT DOCUMENTS

| | | | | |
|---|---|---|---|---|
| 2,521,984 | A * | 9/1950 | Lang | 55/486 |
| 3,017,698 | A * | 1/1962 | Hambrecht et al. | 29/505 |
| 3,023,839 | A * | 3/1962 | Best | 55/359 |
| 3,154,393 | A * | 10/1964 | Klein et al. | 55/501 |
| 3,292,349 | A * | 12/1966 | Cuta | 55/511 |
| 3,333,404 | A * | 8/1967 | Klun | 55/492 |
| 3,759,393 | A * | 9/1973 | Tate et al. | 210/491 |
| 3,830,045 | A * | 8/1974 | Copenhefer | 55/501 |
| 3,938,973 | A * | 2/1976 | Kershaw | 55/501 |
| 4,086,071 | A * | 4/1978 | Champlin | 55/501 |
| 4,105,423 | A * | 8/1978 | Latakas et al. | 55/501 |
| 4,148,732 | A * | 4/1979 | Burrow et al. | 210/232 |
| 4,353,723 | A | 10/1982 | Schulz et al. | |
| 4,561,587 | A | 12/1985 | Wysocki | |
| 5,320,655 | A * | 6/1994 | Ernst | 55/378 |
| 5,429,580 | A | 7/1995 | Diaz | |
| 5,800,588 | A * | 9/1998 | Miller | 55/494 |
| 5,836,861 | A | 11/1998 | Diaz | |
| 6,033,454 | A * | 3/2000 | Hoeffken | 55/494 |
| 6,059,852 | A | 5/2000 | Olson | |
| 6,743,274 | B2 * | 6/2004 | Takagaki | 55/502 |
| 6,758,878 | B2 * | 7/2004 | Choi et al. | 55/497 |
| 7,112,255 | B2 * | 9/2006 | Choi et al. | 156/293 |
| 2005/0050869 | A1 * | 3/2005 | Haes | 55/497 |
| 2005/0217226 | A1 | 10/2005 | Sundet et al. | |
| 2006/0246260 | A1 | 11/2006 | Sundet et al. | |
| 2007/0204573 | A1 * | 9/2007 | Justice | 55/495 |
| 2007/0271887 | A1 * | 11/2007 | Osborne et al. | 55/495 |
| 2007/0289271 | A1 * | 12/2007 | Justice et al. | 55/495 |
| 2007/0289272 | A1 * | 12/2007 | Justice | 55/495 |
| 2007/0289274 | A1 * | 12/2007 | Justice et al. | 55/511 |

* cited by examiner

*Primary Examiner*—Duane Smith
*Assistant Examiner*—Robert A Clemente
(74) *Attorney, Agent, or Firm*—Banner & Witcoff, Ltd

(57) ABSTRACT

The invention provides an air filter with an integral rigid edge. The filter uses a pre-cut sheet of non-woven synthetic filter material. The sheet has a generally rectangular central portion and four outwardly extending side portions. Each side portion is compressed to make it thinner, denser and more rigid than the central portion. The side portions are rolled or folded upon themselves toward the central portion to form a rigid edge around at least a part of the central portion. A method for making the air filter is also provided.

18 Claims, 5 Drawing Sheets

INTEGRAL RIGID EDGING FOR SYNTHETIC AIR FILTERS

FIELD OF THE INVENTION

The invention relates to air filters and, in particular, to methods of constructing air filter assemblies.

BACKGROUND OF THE INVENTION

Various materials are used for air filter media. One common material is non-woven polyester batting, a high loft material that provides an effective filter, while being relatively inexpensive to manufacture. Fibreglass is another material that is commonly used for air filter media. However, there has been a shift to using polyester and other synthetics as filter media, which have improved filtering and dirt-trapping properties.

A common air filter assembly has a cut-out sheet of filter media encased in a rigid cardboard, plastic or metal frame. The frame is used to support the filter media and to keep it fully planar and to prevent the lightweight media from being blown through the air passageway or duct. In many cases, the air filter assembly must be kept in an upright position, so the material must also be supported against sagging. The media itself has almost no body. The frame is also used to protect the filter media, particularly the edges of the media sheet, to prevent fraying and fibre loss. The frame is open in the center, acting as a channel allowing air to pass through the filter media.

In many cases, air filters are considered a consumable item, and manufacturers are under pressure to keep costs down without losing filter effectiveness. As a result, unless there is a structural need to have the filter encased in a metal or plastic frame, cardboard is often preferred as a much cheaper alternative. The cardboard frame can be folded from a paperboard blank. Various methods for making a cardboard frame with finished corners from a paperboard blank, with and without adhesive, are known.

However, there is still a cost associated with the cardboard frame. In addition to the cost of the materials, there is a cost associated with the assembly of the air filter within the frame. Furthermore, there is an environmental cost associated with disposal of the entire filter assembly.

It would be desirable to provide an alternative to the traditional air filter assembly.

SUMMARY OF THE INVENTION

According to a first aspect of the invention, an air filter with an integral rigid edge is provided. A pre-cut sheet of non-woven synthetic filter material is used, which has a generally rectangular central portion and four outwardly extending side portions. Each side portion extends outward from a side of the rectangular central portion. The central portion has a relatively greater thickness than the side portions and a relatively lower density and rigidity than the side portions. The side portions are rolled or folded upon themselves toward the central portion to form a rigid edge around at least a part of the central portion.

Preferably, the central portion has a perimeter defined by where the side portions meet the central portion. The side portions are then rolled or folded so as to surround the perimeter. Preferably, the rolled or folded edges cooperate to frame the central portion.

Each side portion may have a series of interfolded segments as follows:

a first segment adjacent the central portion and folded to lie flat against a first exterior surface thereof;

a second segment folded to lie flat against the first segment;

a third segment folded to form a substantially right angle with the second segment;

a fourth segment folded to form a substantially right angle with the third segment;

a fifth segment folded to lie flat against the fourth segment; and a sixth segment folded to form a substantially right angle with the fifth segment.

The fifth segment further lies flat against a second exterior surface of the central portion. The sixth segment further lies flat against and beneath the third segment. All of the segments cooperate to form a layered integral frame around the central portion.

The framed central portion may have bevelled, overlapping, or nested corners.

The rolled or folded edges may be secured using an adhesive, or they may be heat-secured.

Preferably, the synthetic material of the filter is polyester. Alternatively, the material may be polypropylene, or some other synthetic or synthetic blend.

According to a second aspect of the invention, a method of manufacturing an air filter with an integral rigid edge is provided. The method has the following steps:

cutting a continuous sheet of non-woven synthetic filter material to form a blank having a generally rectangular central portion and four outwardly extending side portions;

compressing the material of the side portions to render them relatively denser, thinner, and more rigid than the material of the central portion; and rolling or folding the side portions upon themselves toward the central portion to form a rigid edge around at least a part of the central portion.

Preferably, the central portion has a perimeter defined by where the side portions meet the central portion and the rolling or folding step comprises rolling or folding the side portions so as to surround the perimeter. The rolling or folding step causes the edges to frame the central portion.

Preferably, the folding step with respect to each side portion comprises:

folding a first segment adjacent the central portion so that the first segment lies flat against a first exterior surface thereof;

folding a second segment so that the second segment lies flat against the first segment;

folding a third segment to form a substantially right angle with the second segment;

folding a fourth segment to form a substantially right angle with the third segment;

folding a fifth segment so that the fifth segment lies flat against the fourth segment; and folding a sixth segment to form a substantially right angle with the fifth segment.

The fifth segment further lies flat against a second exterior surface of the central portion. The sixth segment further lies flat against and beneath the third segment. All of the segments cooperate to form a layered integral frame around the central portion.

The compressing step may further comprise heating the material of the side portions.

DETAILED DESCRIPTION OF THE FIGURES

Figure 1:
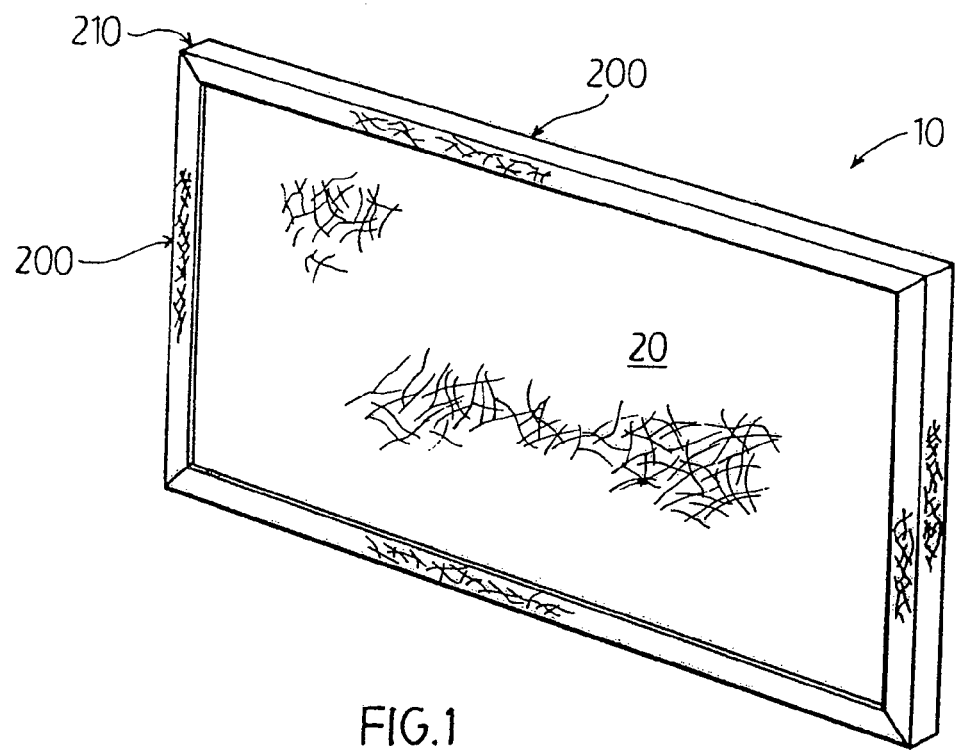
FIG. 1 is a perspective view of a first side of an air filter having integral rigid edges.
Figure 2:
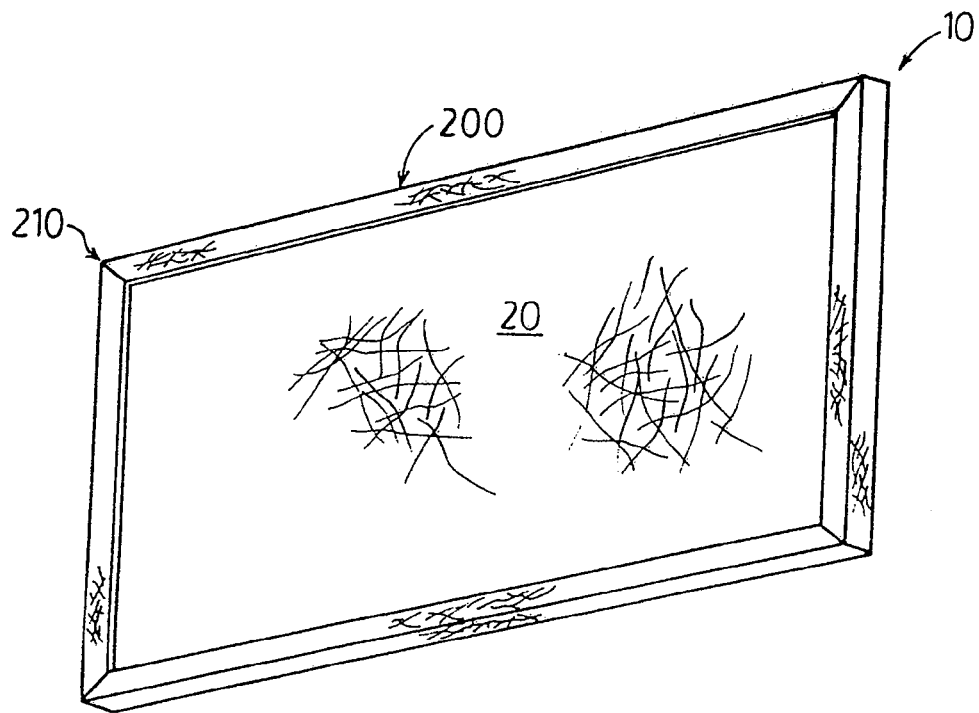
FIG. 2 is a perspective view of a second side of an air filter having integral rigid edges.
Figure 7:
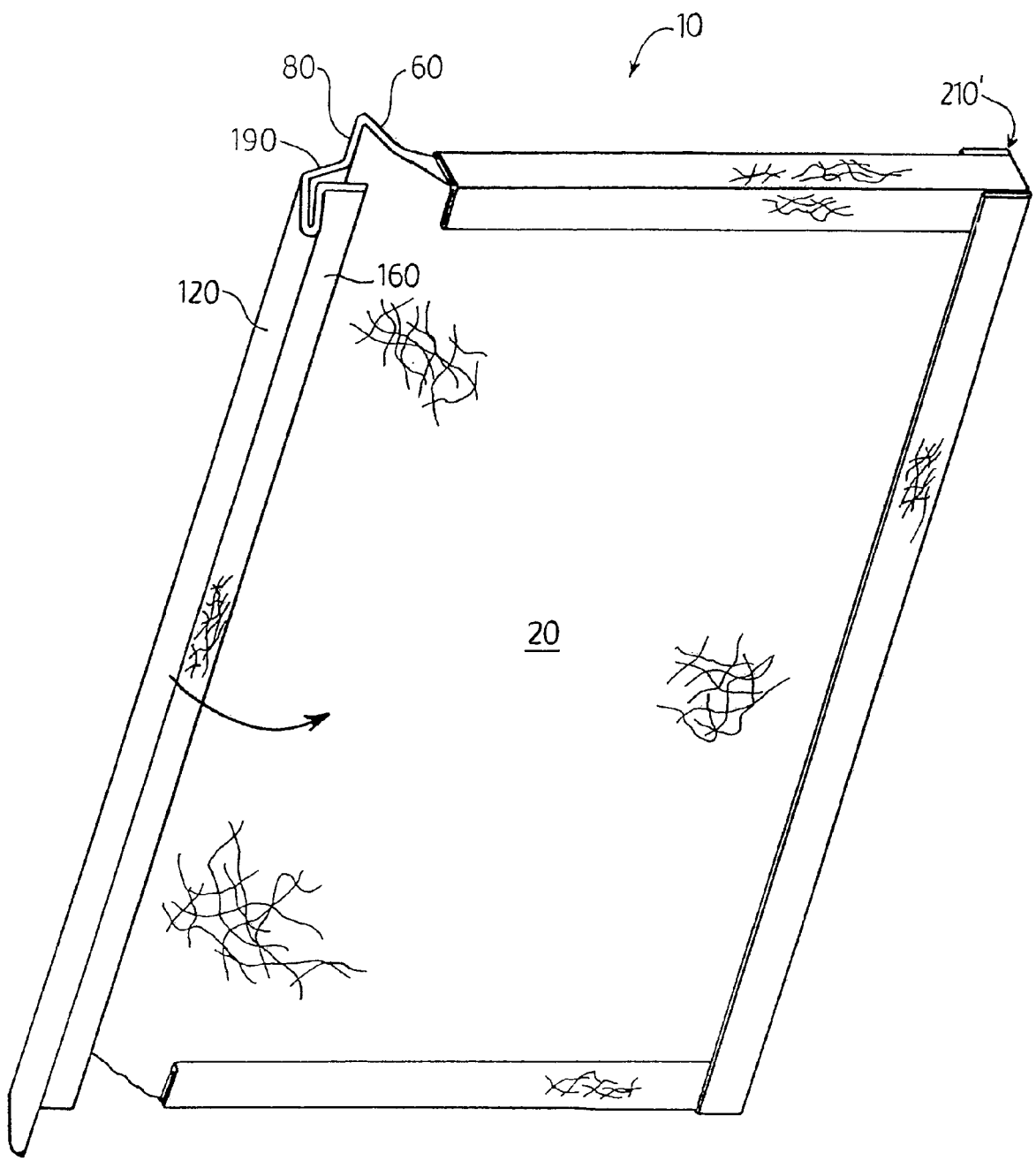
FIG. 7 is a perspective view of an air filter having overlapping corners, partially in unassembled state to show folding sequence of edge.

An air filter with an integral rigid edge is provided. FIGS. 1 and 2 show a preferred embodiment of the filter. The filter 10 has a central portion 20 and an integral rigid edge (generally, 200) surrounding the perimeter of the central portion. The filter 10, as shown in FIGS. 1 and 2, may have bevelled corners 210, or, as shown in FIG. 7, the corners may be overlapping or nested 210'.

Figure 6:
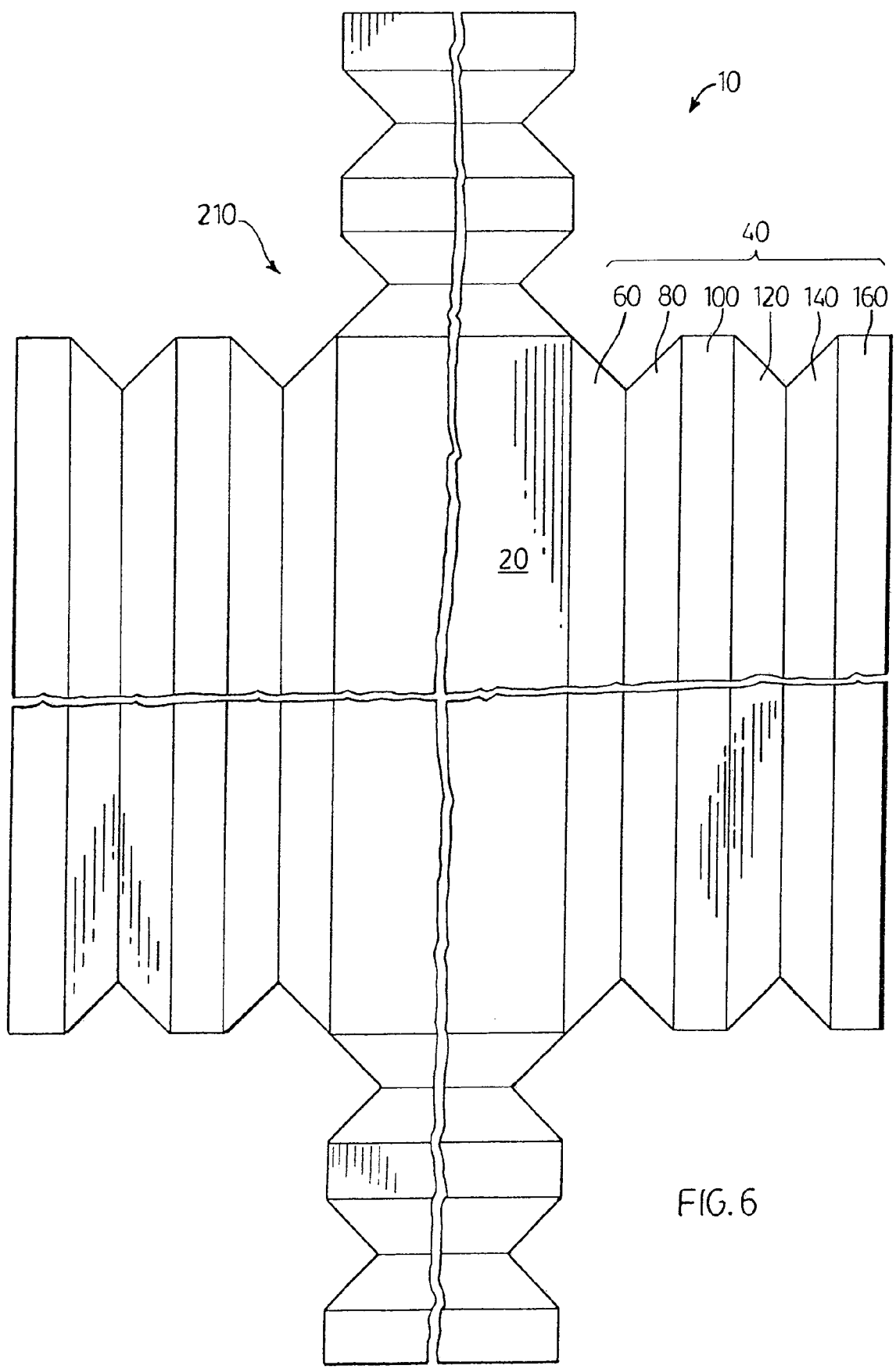
FIG. 6 is a plan view of a filter blank prior to forming constructed rigid edge.

To construct the filter, a high loft batt of polyester material 30 is pre-cut to form a blank. Suitable high loft polyester filter media is readily available (such as the high loft polyester filter media available from Fybon Industries, Ltd. of Toronto, Ontario, Canada). A sample cut out blank is shown in FIG. 6 (cut for a bevelled corner construction). The blank has a central portion 20 from which extend side portions 40. The central portion and side portions are a single unitary piece of material.

Figure 4:
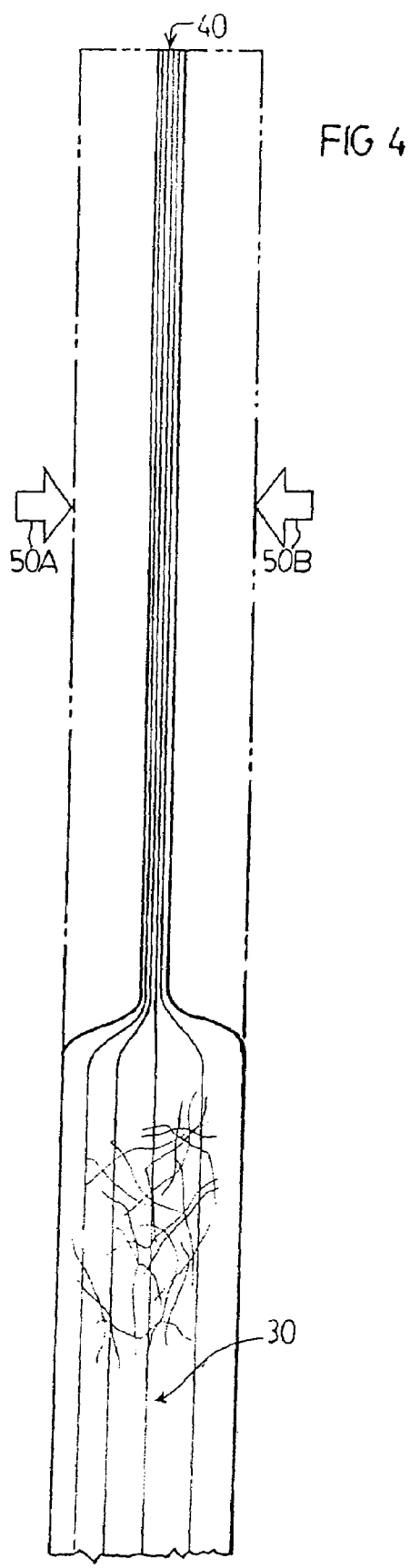
FIG. 4 is a schematic of compression process to compress an edge portion of the filter media prior to forming the constructed rigid edge.

After cutting, each side portion 40 is compressed (notionally illustrated in FIG. 4 as between compression elements 50A and 50B). The compression is preferably by heated element, or by applying heat and then processing by a compression tool (e.g. pressing between calender rollers). Polyester batting has a melt temperature around 250° C. By applying heat and compression, the side portions 40 are rendered thinner, denser and more rigid than the uncompressed material of the central portion 30. Once heated and compressed (to a thickness of around 1/32 of an inch, as compared to the uncompressed thickness of the batt of around 1 inch), the side portion 40 is then rolled or folded to form the edge. This shaping is preferably done while the side portion is still warm and pliant. Folded embodiments are shown in the drawings and described in detail herein, however, it will be understood that the rigid edge need not be folded, but may be rolled or gathered to form the edge. Likewise, the particular arrangement of folds outlined in the present disclosure is not to be taken as limiting.

Figure 5:
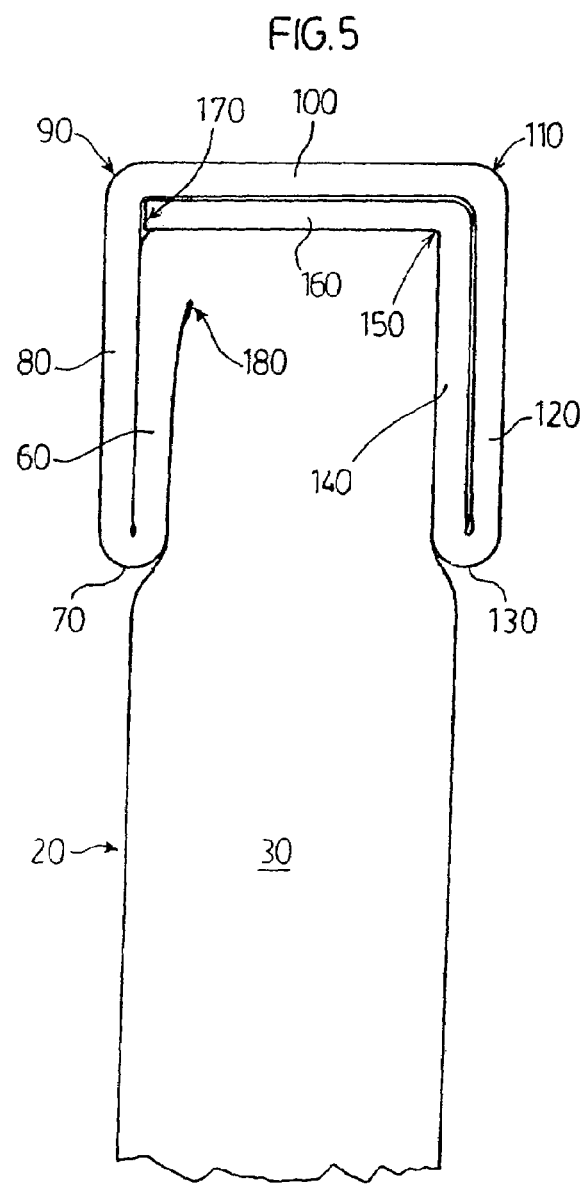
FIG. 5 is a section view showing the folded structure of the edge.

One particular folded structure is shown in FIG. 5. The side portion has six segments (shown flat in FIG. 6 and partially folded in FIG. 7). To fold the segments together:

The first segment 60 is folded to lie flat against a first exterior surface of the filter at joint 180;

The second segment 80 is folded 180° to the first segment 60 at joint 70;

The third segment 100 is folded 90° to the second segment 80 to form corner 90;

The fourth segment 120 is folded 90° to the third segment 100 to form corner 110;

The fifth segment 140 is folded 180° to the fourth segment 120 at joint 130;

The sixth segment 160 is folded 90° to the fifth segment 140.

Figure 3:
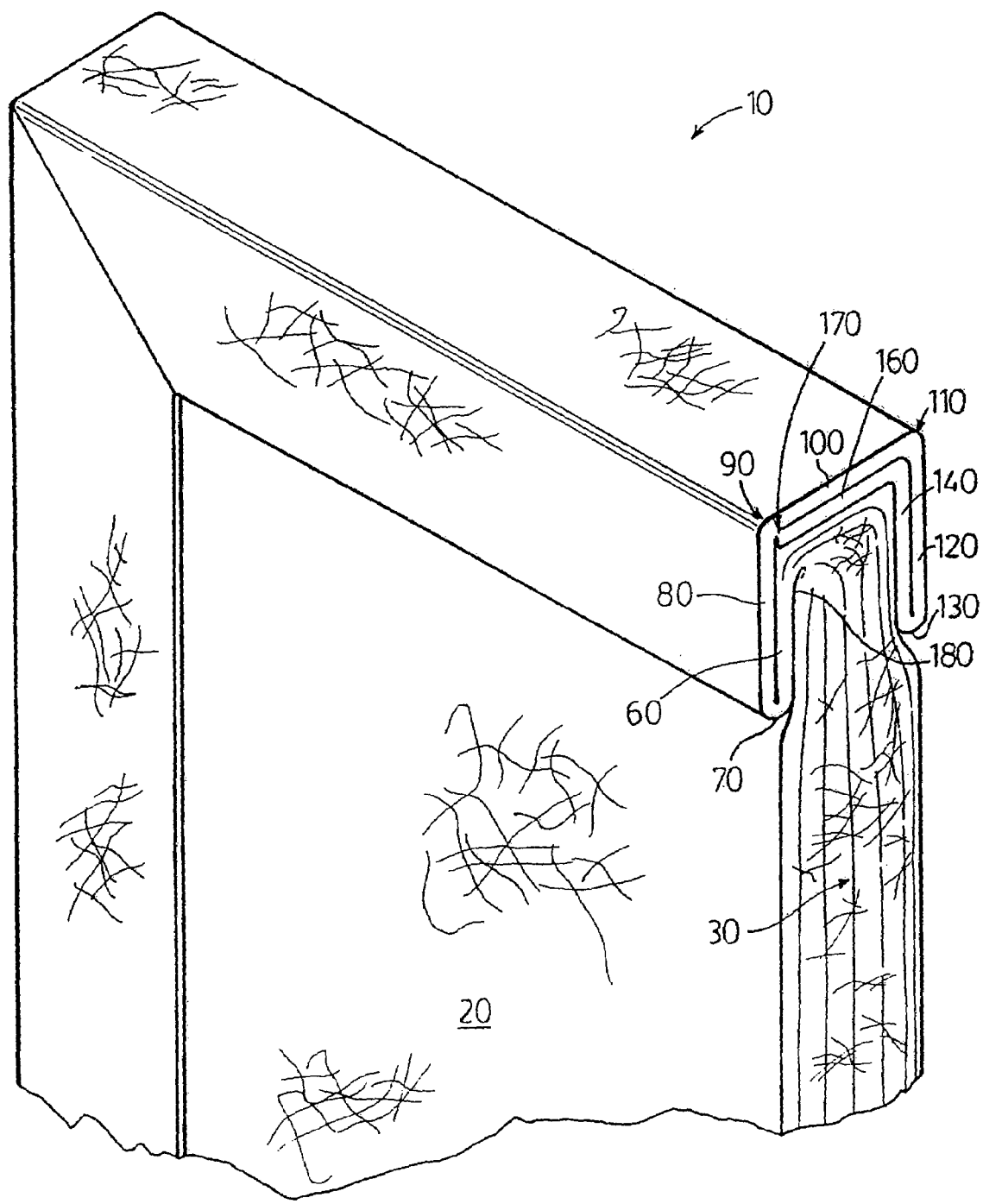
FIG. 3 is a detailed perspective view of a corner of the air filter of FIG. 1 sectioned to show edge construction.

As will be understood having reference to FIGS. 3 and 5, the folded structure provides a two-layer rigid edge to surround the thickness of the material 30 in the central portion. The sixth segment terminates at end 170 which is the distal end of the side portion 40. Thus, the raw edge of the material is hidden under the edge and will not easily fray from handling and installation. The exposed joints 70, 130 and corners 90, 110 are folded material only.

The folding may be done by hand or by machine. The folded structure may be secured by adhesive. However, it has been discovered that an acceptable folded structure can be made without adhesive simply by folding the edge while the side portion remains warm and tacky. Thus, the filter reduces several manufacturing costs by eliminating the need for a separate frame element (of cardboard, plastic or metal), and by eliminating the need for glue. The resulting filter structure is considered to be similarly stable as a standard cardboard filter assembly in standard dimensions.

It will be appreciated that while polyester is mentioned as a preferred synthetic material herein, other synthetic filter media may be used with the novel edge structure described. For instance, polypropylene batting may be used or another synthetic or blended synthetic.

There are additional advantages of the novel filter structure described herein. Since the filter media is integral with the "frame", there is no gap between the frame and the filter. Furthermore, the filter can be washed and re-used, which would be impossible with a cardboard frame filter assembly. Some formulations of the filter media may also be recyclable in certain jurisdictions.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:

1. An air filter with an integral rigid edge, comprising:
a pre-cut sheet of non-woven synthetic filter material having a generally rectangular central portion and four outwardly extending side portions, each extending outwardly from a side of the rectangular central portion; the central portion being of:
a relatively greater thickness than the side portions; and
a relatively lower density and rigidity than the side portions;
the side portions being rolled or folded upon themselves toward the central portion to form a rigid edge around at least a part of the central portion.

2. The air filter of claim 1, wherein the central portion has a perimeter defined by where the side portions meet the central portion; the side portions being rolled or folded so as to surround the perimeter.

3. The air filter of claim 1, wherein the rolled or folded edges cooperate to frame the central portion.

4. The air filter of claim 1, wherein each side portion comprises:
a first segment adjacent the central portion and folded to lie flat against a first exterior surface thereof;

a second segment folded to lie flat against the first segment;

a third segment folded to form a substantially right angle with the second segment;

a fourth segment folded to form a substantially right angle with the third segment;

a fifth segment folded to lie flat against the fourth segment; and a sixth segment folded to form a substantially right angle with the fifth segment;

wherein the fifth segment further lies flat against a second exterior surface of the central portion; and wherein the sixth segment further lies flat against and beneath the third segment;

all of the segments cooperating to form a layered integral frame around the central portion.

5. The air filter of claim 4, wherein the framed central portion has bevelled corners.

6. The air filter of claim 4, wherein the framed central portion has overlapping or nested corners.

7. The air filter of claim 1, wherein the rolled or folded edges are secured using an adhesive.

8. The air filter of claim 1, wherein the rolled or folded edges are heat-secured.

9. The air filter of claim 1, wherein the synthetic material comprises polyester.

10. The air filter of claim 1, wherein the synthetic material comprises polypropylene.

11. An air filter with an integral folded rigid edge, comprising:

a pre-cut sheet of non-woven synthetic filter material having a generally rectangular central portion and four outwardly extending side portions, each extending outwardly from a side of the rectangular central portion; the central portion being of:

a relatively greater thickness than the side portions; and a relatively lower density and rigidity than the side portions; and each side portion comprising:

a first segment adjacent the central portion and folded to lie flat against a first exterior surface thereof;

a second segment folded to lie flat against the first segment;

a third segment folded to form a substantially right angle with the second segment;

a fourth segment folded to form a substantially right angle with the third segment;

a fifth segment folded to lie flat against the fourth segment; and a sixth segment folded to form a substantially right angle with the fifth segment;

wherein the fifth segment further lies flat against a second exterior surface of the central portion; and wherein the sixth segment further lies flat against and beneath the third segment;

all of the segments cooperating to form a layered integral frame around the central portion.

12. A method of manufacturing an air filter with an integral rigid edge, comprising:

cutting a continuous sheet of non-woven synthetic filter material to form a blank having a generally rectangular central portion and four outwardly extending side portions;

compressing the material of the side portions to render them relatively denser, thinner, and more rigid than the material of the central portion;

rolling or folding the side portions upon themselves toward the central portion to form a rigid edge around at least a part of the central portion.

13. The method of claim 12, wherein the central portion has a perimeter defined by where the side portions meet the central portion and the rolling or folding step comprises rolling or folding the side portions so as to surround the perimeter.

14. The method of claim 12, wherein the rolling or folding step causes the edges to frame the central portion.

15. The method of claim 12, wherein the folding step with respect to each side portion comprises:

folding a first segment adjacent the central portion so that the first segment lies flat against a first exterior surface thereof;

folding a second segment so that the second segment lies flat against the first segment;

folding a third segment to form a substantially right angle with the second segment;

folding a fourth segment to form a substantially right angle with the third segment;

folding a fifth segment so that the fifth segment lies flat against the fourth segment; and folding a sixth segment to form a substantially right angle with the fifth segment;

wherein the fifth segment further lies flat against a second exterior surface of the central portion; and wherein the sixth segment further lies flat against and beneath the third segment;

all of the segments cooperating to form a layered integral frame around the central portion.

16. The method of claim 12, wherein the compressing step further comprises heating the material of the side portions.

17. The method of claim 12, wherein the material comprises polyester.

18. The method of claim 12, wherein the material comprises polypropylene.

* * * * *